United States Patent
Briere et al.

(10) Patent No.: US 9,461,463 B2
(45) Date of Patent: *Oct. 4, 2016

(54) DC/DC CONVERTER WITH III-NITRIDE SWITCHES

(71) Applicant: Infineon Technologies Americas Corp., El Segundo, CA (US)

(72) Inventors: Michael A. Briere, Scottsdale, AZ (US); Jason Zhang, Monterey Park, CA (US); Bo Yang, Plano, TX (US)

(73) Assignee: Infineon Technologies Americas Corp., El Segundo, CA (US)

( * ) Notice: Subject to any disclaimer, the term of this patent is extended or adjusted under 35 U.S.C. 154(b) by 126 days.

This patent is subject to a terminal disclaimer.

(21) Appl. No.: 14/210,151

(22) Filed: Mar. 13, 2014

(65) Prior Publication Data

US 2014/0192441 A1 Jul. 10, 2014

Related U.S. Application Data

(63) Continuation of application No. 12/928,102, filed on Dec. 3, 2010, now Pat. No. 8,674,670, which is a continuation-in-part of application No. 11/986,848, filed on Nov. 27, 2007, now Pat. No. 7,902,809.

(60) Provisional application No. 61/337,369, filed on Feb. 3, 2010.

(51) Int. Cl.
*H02M 3/158* (2006.01)
*H02H 7/12* (2006.01)
*H02M 1/32* (2007.01)

(52) U.S. Cl.
CPC ............. *H02H 7/1213* (2013.01); *H02M 1/32* (2013.01); *H02M 3/1588* (2013.01); *Y02B 70/1466* (2013.01); *Y02B 70/1483* (2013.01)

(58) Field of Classification Search
CPC ..................................................... H02M 3/158
USPC ........................................ 323/271, 282, 351
See application file for complete search history.

(56) References Cited

U.S. PATENT DOCUMENTS 6,011,416 A * 1/2000 Mizuno .............. H03K 17/0822
                                           327/108
6,150,798 A * 11/2000 Ferry ........................ G05F 1/56
                                           323/273

(Continued)

FOREIGN PATENT DOCUMENTS

| DE | 102007057657 | * | 7/2008 | ............ H02M 3/158 |
| JP | 0011353038 | * | 12/1999 | ................ G05F 1/10 |
| JP | 2008187885 | * | 8/2008 | ............ H02M 3/1588 |

*Primary Examiner* — Jeffrey Sterrett
(74) *Attorney, Agent, or Firm* — Murphy, Bilak & Homiller, PLLC (57) ABSTRACT

Disclosed is a buck converter for converting a high voltage at the input of the buck converter to a low voltage at the output of the buck converter. The buck converter includes a control circuitry configured to control a duty cycle of a control switch, the control switch being interposed between the input and the output of the buck converter. A synchronous switch is interposed between the output and ground. The control switch and the synchronous switch comprise depletion-mode III-nitride transistors. In one embodiment, at least one of the control switch and the synchronous switches comprises a depletion-mode GaN HEMT. The buck converter further includes protection circuitry configured to disable current conduction through the control switch while the control circuitry is not powered up.

15 Claims, 5 Drawing Sheets

(56) References Cited

U.S. PATENT DOCUMENTS

| | | | | |
|---|---|---|---|---|
| 6,597,210 B2* | 7/2003 | Carsten | H02M 3/1588 | 327/108 |
| 6,693,412 B2* | 2/2004 | Ruan | G06F 1/26 | 323/225 |
| 6,707,281 B2* | 3/2004 | Solivan | G06F 1/26 | 323/225 |
| 7,006,362 B2* | 2/2006 | Mizoguchi | H02M 3/158 | 32/271 |
| 7,839,131 B2* | 11/2010 | Yang | H02M 3/1588 | 323/282 |
| 7,863,877 B2* | 1/2011 | Briere | H01L 27/0211 | 323/222 |
| 7,902,809 B2* | 3/2011 | Briere | H02M 3/1588 | 323/271 |
| 8,063,616 B2* | 11/2011 | Bahramian | H02M 1/08 | 323/271 |
| 8,072,202 B2* | 12/2011 | Yang | H02M 3/1588 | 323/282 |
| 8,084,783 B2* | 12/2011 | Zhang | H01L 27/0605 | 257/109 |
| 8,148,957 B2* | 4/2012 | Zhang | H02M 1/088 | 323/225 |
| 8,148,964 B2* | 4/2012 | Briere | H01L 27/0211 | 323/222 |
| 8,674,670 B2* | 3/2014 | Briere | H02M 1/32 | 323/271 |
| 2002/0171405 A1* | 11/2002 | Watanabe | H02M 3/00 | 323/282 |
| 2004/0012376 A1* | 1/2004 | Taghizadeh-Kaschani | H02M 3/156 | 323/282 |
| 2006/0198173 A1* | 9/2006 | Rozman | H02M 1/08 | 363/123 |
| 2006/0233000 A1* | 10/2006 | Akagi | H02M 5/4585 | 363/37 |
| 2006/0261794 A1* | 11/2006 | May | H02M 3/158 | 323/283 |
| 2007/0008747 A1* | 1/2007 | Soldano | H02M 7/217 | 363/21.04 |
| 2008/0122418 A1* | 5/2008 | Briere | H02M 3/1588 | 323/282 |
| 2009/0180304 A1* | 7/2009 | Bahramian | H02M 1/08 | 363/124 |
| 2009/0278513 A1* | 11/2009 | Bahramian | H01L 21/8258 | 323/217 |
| 2011/0080156 A1* | 4/2011 | Briere | H02M 1/32 | 323/351 |
| 2012/0062199 A1* | 3/2012 | Bahramian | H02M 1/08 | 323/282 |
| 2014/0192441 A1* | 7/2014 | Briere | H02M 1/32 | 361/18 |

* cited by examiner

DC/DC CONVERTER WITH III-NITRIDE SWITCHES

This is a continuation of application Ser. No. 12/928,102 filed Dec. 3, 2010.

The present application claims the benefit of and priority to a pending provisional application entitled "DC/DC Converter with Depletion Mode III-Nitride Transistors," Ser. No. 61/337,369 filed on Feb. 3, 2010. The disclosure in that pending provisional application is hereby incorporated fully by reference into the present application. The present application is also a continuation-in-part of, and claims benefit of the filing date of, and hereby incorporates fully by reference, the application entitled "Synchronous DC/DC Converter," Ser. No. 11/986,848, filed Nov. 27, 2007, which itself claims priority to a provisional application Ser. No. 60/867,437 filed on Nov. 28, 2006.

BACKGROUND OF THE INVENTION

1. Field of the Invention

The present invention generally relates to the field of electrical circuits. More particularly, the present invention relates to DC/DC conversion circuits.

2. Background Art

In voltage conversion circuitry, a buck converter is commonly used to convert a high DC voltage to a low DC voltage. A buck converter typically includes a switch between an input and an output of the buck converter (also referred to as a "control switch") and a switch between the output of the buck converter and ground (also referred to as a "synchronous switch"). The buck converter can also include control circuitry to control the duty cycles of these switches so as to convert a high input voltage to a low output voltage. When the control circuitry is not powered and is not operational to control the switches, conducting current through the switches can damage electrical components by introducing short circuits.

Conventional buck converters utilize enhancement-mode transistors as switches, which are normally off during start up and in the absence of a defined gate voltage, to avoid conducting current through the switches while the control circuitry is not fully powered up. The switches typically comprise silicon transistors, which can be easily formed as enhancement-mode transistors. However, III-nitride transistors offer advantages over silicon transistors when utilized in buck converters due to, for example, the higher voltage handling capability of III-nitride transistors. III-nitride transistors are less costly and more efficient to mass-produce as depletion-mode transistors, which are normally on during start up and in the absence of a defined gate voltage, and which can unfortunately introduce short circuit while control circuitry is not fully powered up.

Thus, there is a need in the art for voltage conversion circuitry that can utilize cost efficient depletion-mode III-nitride transistors, while avoiding damage caused by potential short circuits when control circuitry is not fully powered up.

SUMMARY OF THE INVENTION

The present application is directed to a DC/DC converter with depletion-mode III-nitride transistors, substantially as shown in and/or described in connection with at least one of the figures, as set forth more completely in the claims.

DETAILED DESCRIPTION OF THE INVENTION

The present invention is directed to various embodiments of a DC/DC converter with depletion-mode III-nitride transistors. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention.

The drawings in the present application and their accompanying detailed description are directed to merely exemplary embodiments of the invention. To maintain brevity, other embodiments of the present invention are not specifically described in the present application and are not specifically illustrated by the present drawings.

In the present application, "III-nitride" refers to a compound semiconductor that includes nitrogen and at least one group III element such as, but not limited to, GaN, AlGaN, InN, AlN, InGaN, InAlGaN and the like.

Figure 1:
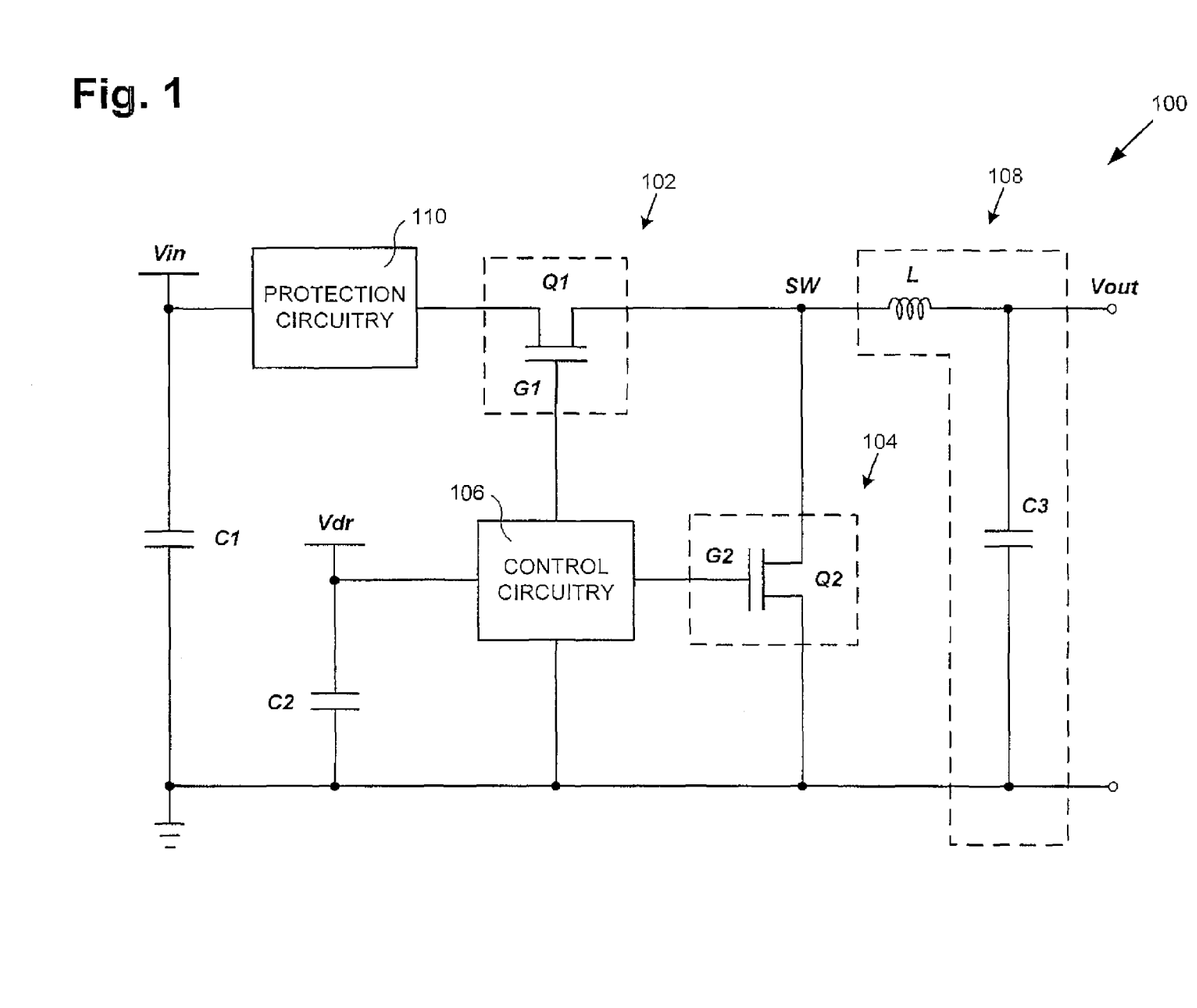
FIG. 1 shows a circuit diagram of an exemplary voltage conversion circuit in accordance with one embodiment of the present invention.

FIG. 1 shows a circuit diagram of an exemplary voltage conversion circuit in accordance with one embodiment of the present invention. Voltage conversion circuit 100 comprises a synchronous buck converter circuit that can be used for DC/DC power conversion. As shown in FIG. 1, voltage conversion circuit 100 includes control switch 102, synchronous switch 104, control circuitry 106, output circuitry 108, protection circuitry 110, and capacitors C1 and C2.

In FIG. 1, voltage conversion circuit 100 is configured to convert an input voltage, for example, a high DC input voltage, to an output voltage, for example, a low DC output voltage. Thus, input voltage Vin can be provided to voltage conversion circuit 100, which can then provide output voltage Vout, for example, to a load across output circuitry 108.

In one embodiment, input voltage Vin can be provided by connecting voltage conversion circuit 100 to a rectifier across capacitor C1, where capacitor C1 can provide filtering for unregulated DC voltage from the rectifier.

Further shown in FIG. 1, voltage conversion circuit 100 includes control circuitry 106, which can provide a switched voltage at switched node SW by controlling a duty cycle of control switch 102 in buck arrangement with synchronous switch 104. Control circuitry 106 is configured to drive control switch 102 and synchronous switch 104 using, for example, driver voltage Vdr. By driving control switch 102 and synchronous switch 104, control circuitry 106 can control voltages at switched node SW, thereby controlling output voltage Vout of voltage conversion circuit 100.

In voltage conversion circuit 100, control switch 102 includes depletion-mode (D-mode) transistor Q1 having gate G1 for driving control switch Q1. Similarly, synchronous switch 104 includes D-mode transistor Q2 having gate G2 for driving synchronous switch 104. As shown in FIG. 1, control circuitry 106 is coupled to respective gates G1 and G2 of D-mode transistor Q1 in control switch 102 and D-mode transistor Q2 in synchronous switch 104. As such, control circuitry 106 can control D-mode transistor Q1 and D-mode transistor Q2 by transmitting control signals to respective gates G1 and G2 to selectively enable or disable control switch 102 and control switch 104. In one embodiment, control circuitry 106 can use measured values of output voltage Vout to adjust the timing of control signals to gates G1 and G1 to vary duty cycles of control switch 102 and synchronous switch 104, thereby adjusting output voltage Vout. For example, control circuitry 106 can adjust output voltage Vout to maintain a predetermined fixed output voltage regardless of changes to input voltage Vin.

Notably, both D-mode transistor Q1 and D-mode transistor Q2 comprise depletion-mode III-nitride transistors. Furthermore, one or both of D-mode transistor Q1 and D-mode transistor Q2 can comprise depletion-mode Gallium Nitride (GaN) transistors, for example, GaN high electron mobility transistors (HEMTs). As III-nitride transistors, D-mode transistors Q1 and Q2 can have desirable performance characteristics when utilized in a buck converter. For example, III-nitride transistors, such as III-nitride HEMTs, can have reduced parasitic capacitances compared to similar silicon based transistors, allowing for higher switching frequencies. Furthermore, depletion-mode III-nitride transistors are less costly and more efficient to mass-produce relative to similar enhancement-mode III-nitride transistors. Thus, by providing for depletion-mode III-nitride transistors, such as depletion-mode GaN transistors, voltage conversion circuit 100 can be produced efficiently with low cost.

Voltage conversion circuit 100 further includes output circuitry 108, coupled to switched node SW across synchronous switch 104, to provide output voltage Vout to, for example, a load across output circuitry 108. As shown in FIG. 1, output circuitry 108 includes inductor L and capacitor C3. In operation, voltage conversion circuit 100 can alternate between connecting inductor L and input voltage Vin to store energy in inductor L and discharging inductor L to a load. More specifically, control circuitry 106 can drive control switch 102 and synchronous switch 104 such that while storing energy in inductor L, D-mode transistor Q1 can be on and D-mode transistor Q2 can be off and while discharging inductor L, D-mode transistor Q1 can be off and D-mode transistor Q2 can be on.

Also in FIG. 1, voltage conversion circuit 100 includes protection circuitry 110 and can utilize protection circuitry 110 to protect electrical components from electrical damage while control circuitry 106 is not powered and is not operational to drive control switch 102. For example, protection circuitry 110 can provide protection to electrical components by disabling control switch 102 during power up of control circuitry 106. More particularly, without protection circuitry 110, there is a risk of electrical damage before Vdr can power up control circuitry 106 to drive control switch 102. For example, control switch 102 includes D-mode transistor Q1, which is normally on and synchronous switch 104 includes D-mode transistor Q2, which is also normally on. Thus, as voltage conversion circuit 100 is powered on, for example, using Vdr, without protection circuitry 110, input voltage Vin can be provided directly to switched node SW and output circuitry 108 through D-mode transistor Q1, as well as to ground through D-mode transistor Q2, which can damage voltage conversion circuit 100 and/or a load connected to voltage conversion circuit 100.

Protection circuitry 110 can further provide protection to electrical components by disabling control switch 102 during power down of control circuitry 106. For example, without protection circuitry 110, there is a risk of damage to electrical components after control circuitry 106 can no longer be powered, for example, by Vdr, to drive control switch 102 and synchronous switch 104. Thus, in an embodiment of the present invention, protection circuitry 110 can protect electrical components from electrical damage during power up and also during power down of control circuitry 106.

In the embodiment shown in FIG. 1, protection circuitry 110 is connected between input voltage Vin and control switch 102 and can connect and disconnect input voltage Vin to and from control switch 102 and thereby to and from voltage conversion circuit 100. It will be appreciated that in other embodiments, protection circuitry 110 can be disposed elsewhere, for example, between control switch 102 and switched node SW. Thus, protection circuitry 110 can disable current conduction through control switch 102 when control circuitry 106 is not powered and is not operational to drive control switch 102, thereby avoiding short circuit.

Figure 2:
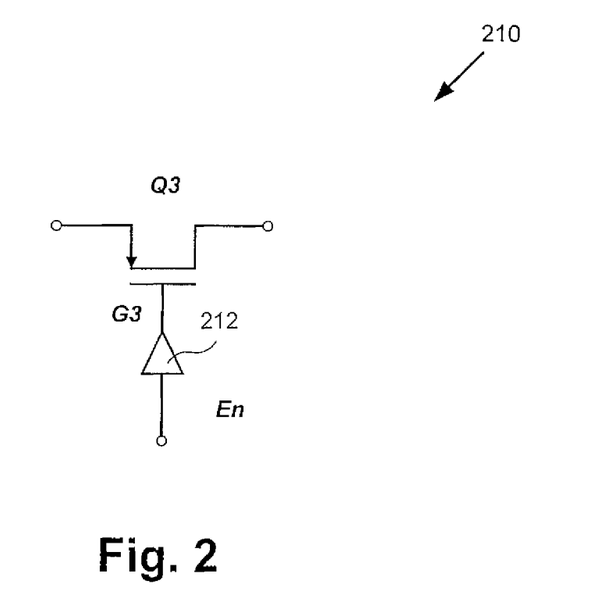
FIG. 2 shows a circuit diagram of exemplary protection circuitry, which can be utilized in a voltage conversion circuit in accordance with one embodiment of the present invention.

FIG. 2 shows a circuit diagram of exemplary protection circuitry 210, which can be utilized in a voltage conversion circuit in accordance with one embodiment of the present invention. Protection circuitry 210 can correspond to protection circuitry 110 in FIG. 1 and can similarly protect electrical components from short circuit.

As shown in FIG. 2, protection circuitry 210 includes enhancement-mode (E-mode) transistor Q3 having gate G3 driven by buffer 212 and enable signal En. E-mode transistor Q3 is preferably a silicon p-channel transistor, for example, a silicon metal-oxide-semiconductor field-effect transistor (MOSFET).

Figure 3:
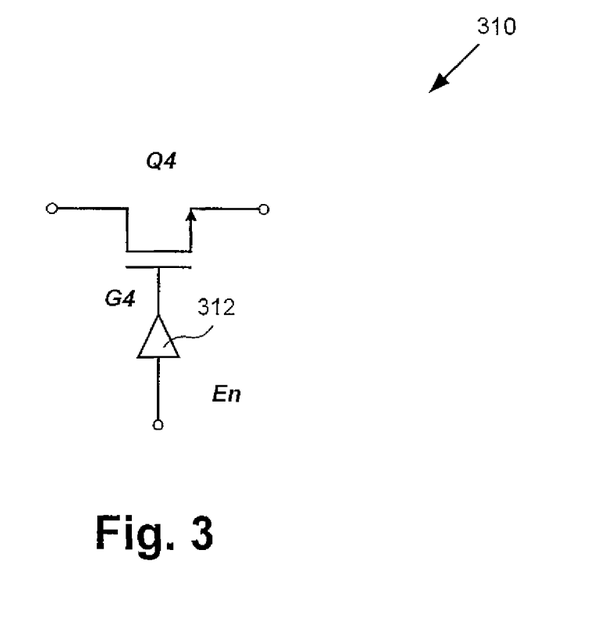
FIG. 3 shows a circuit diagram of another exemplary protection circuitry, which can be utilized in a voltage conversion circuit in accordance with one embodiment of the present invention.

FIG. 3 shows a circuit diagram of exemplary protection circuitry 310, which can be utilized in a voltage conversion circuit in accordance with one embodiment of the present invention. Protection circuitry 310 can correspond to protection circuitry 110 in FIG. 1 and can similarly protect electrical components from short circuit.

As shown in FIG. 3, protection circuitry 310 includes enhancement-mode (E-mode) transistor Q4 having gate G4 driven by buffer 312 and enable signal En. E-mode transistor Q4 is preferably a silicon n-channel transistor, for example, a silicon MOSFET.

While in protection circuitry 210 and 310, respective E-mode transistors Q3 and Q4 comprise enhancement-mode silicon based transistors, it will be appreciated that protection circuitry 110 is not limited to the embodiments in FIGS. 2 and 3. For example, while E-mode transistors Q3 and Q4 comprise silicon based semiconductor devices, in other embodiments, E-mode transistors Q3 and Q4 can comprise III-nitride semiconductor devices. However, silicon based semiconductor devices can be provided at reduced cost and size relative to comparable III-nitride devices. As such, silicon based semiconductor devices are preferred for protection switch 110.

Figure 4:
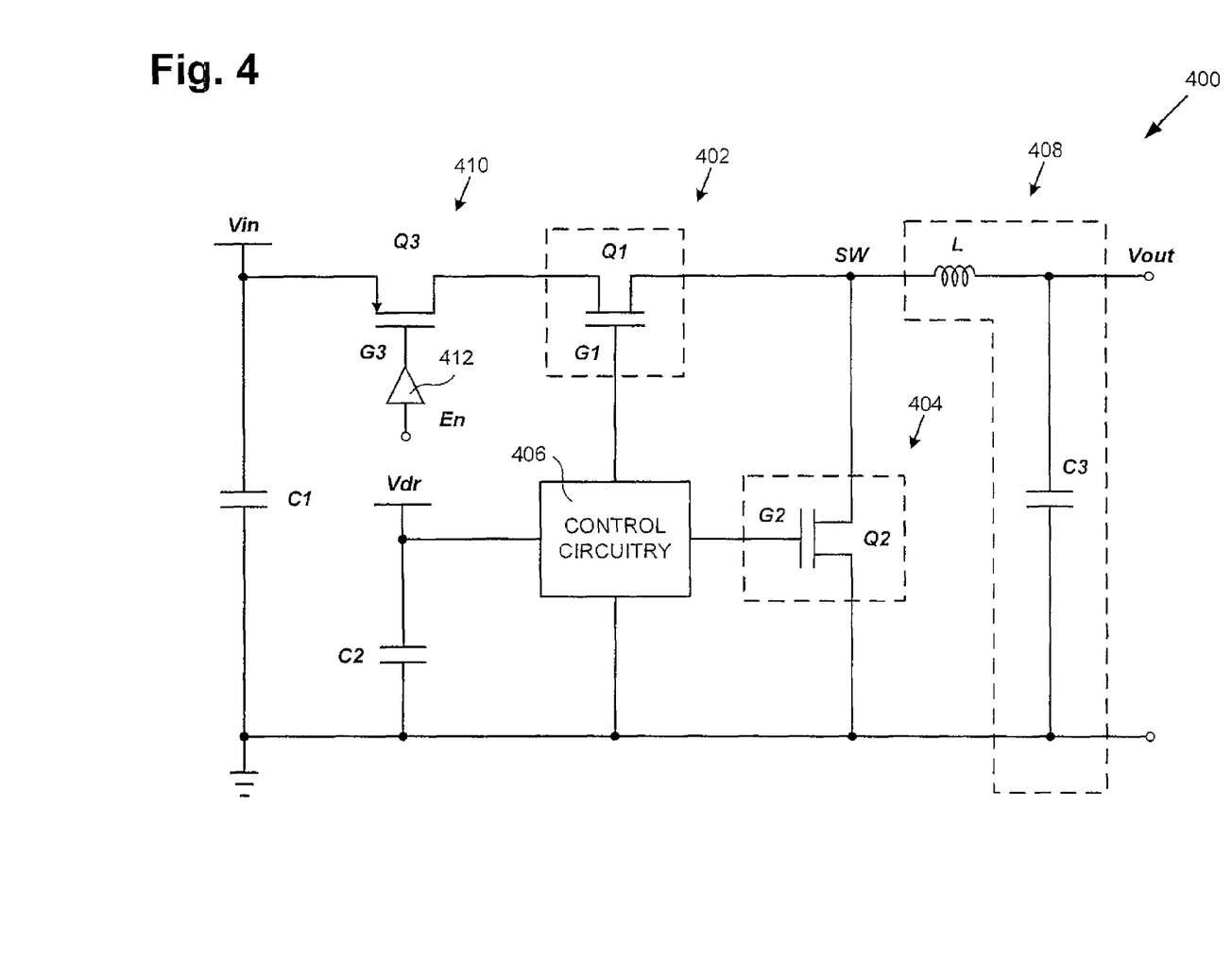
FIG. 4 shows a circuit diagram of an exemplary voltage conversion circuit in accordance with one embodiment of the present invention.

FIG. 4 shows a circuit diagram of exemplary voltage conversion circuit 400 in accordance with one embodiment of the present invention. Voltage conversion circuit 400 includes protection circuitry 410, which corresponds to protection circuitry 210 in FIG. 2. As such, voltage conversion circuit 400 corresponds to voltage conversion circuit 100 in FIG. 1 using protection circuitry 210 in FIG. 2 as protection circuitry 110. Thus, voltage conversion circuit 400 can function similar to voltage conversion circuit 100 in FIG. 1.

In voltage conversion circuit 400, E-mode transistor Q3 of protection circuitry 410 is connected between input voltage Vin and control switch 402. More particularly, the source of E-mode transistor Q3 is connected to Vin and the drain of E-mode transistor Q3 is connected to control switch 402. Thus, when E-mode transistor Q3 is disabled, current cannot conduct through control switch 402 because current cannot conduct through E-mode transistor Q3. Thus, E-mode transistor Q3 can connect and disconnect input voltage Vin to and from control switch 402 and thereby to and from voltage conversion circuit 400.

Figure 5:
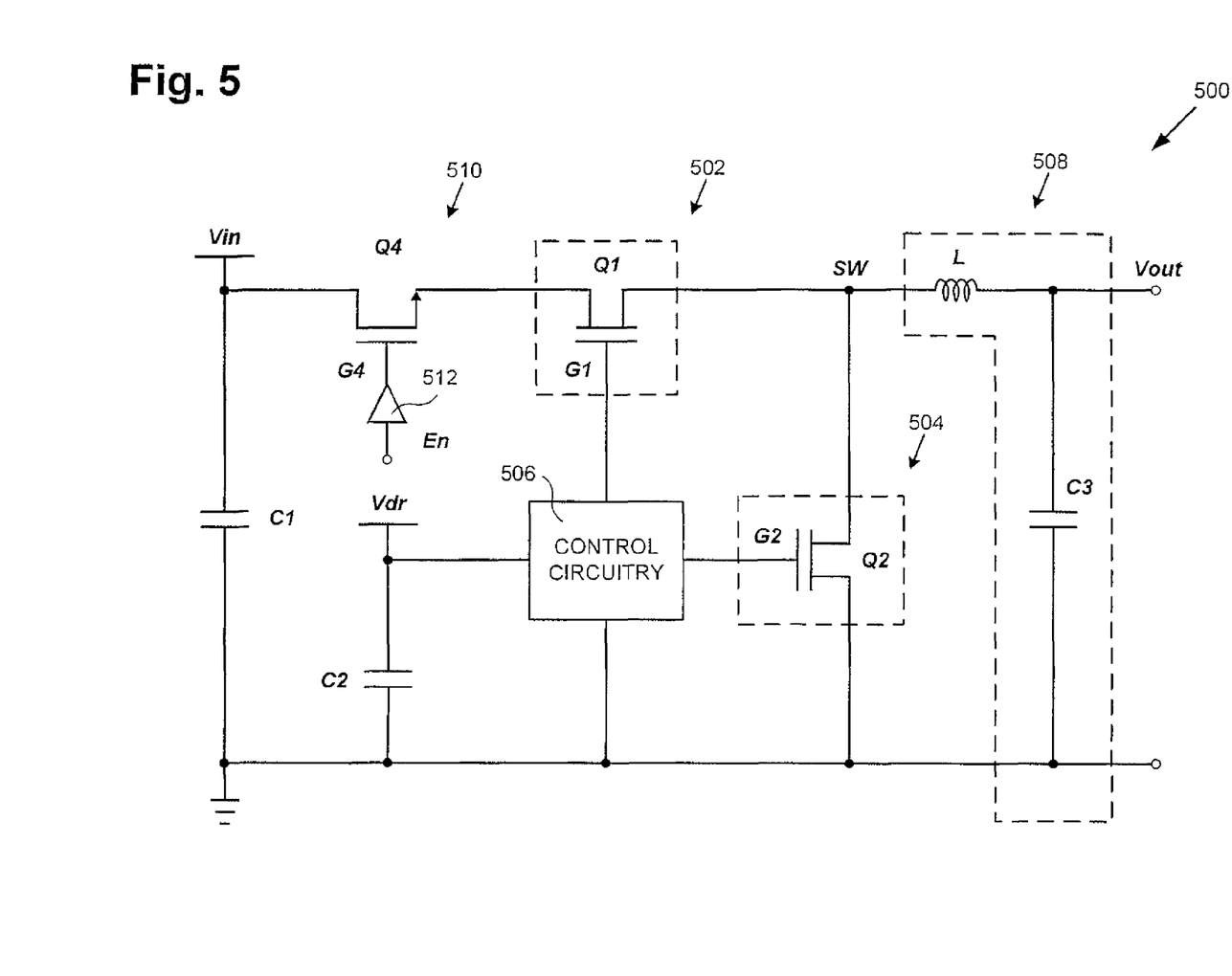
FIG. 5 shows a circuit diagram of an exemplary voltage conversion circuit in accordance with one embodiment of the present invention.

FIG. 5 shows a circuit diagram of exemplary voltage conversion circuit 500 in accordance with one embodiment of the present invention. Voltage conversion circuit 500 includes protection circuitry 510, which corresponds to protection circuitry 310 in FIG. 3. As such, voltage conversion circuit 500 corresponds to voltage conversion circuit 100 in FIG. 1 using protection circuitry 310 in FIG. 3 as protection circuitry 110. Thus, voltage conversion circuit 500 can function similar to voltage conversion circuit 100 in FIG. 1.

In voltage conversion circuit 500, E-mode transistor Q4 is connected between input voltage Vin and control switch 502. More particularly, the drain of E-mode transistor Q4 is connected to Vin and the source of E-mode transistor Q4 is connected to control switch 502. Thus, when E-mode transistor Q4 is disabled, current cannot conduct through control switch 502 because current cannot conduct through E-mode transistor Q4. Thus, E-mode transistor Q4 can connect and disconnect input voltage Vin to and from control switch 102 and thereby to and from voltage conversion circuit 500.

Protection circuitry 510 will not conduct absent a voltage on gate G4 because E-mode transistor Q4 is a normally off transistor. To conduct, protection circuitry 510 requires a voltage on gate G4 of E-mode transistor Q4 that is greater than Vin by one threshold drop since E-mode transistor Q4 is an n-channel transistor. Thus, protection circuitry 510 includes enable signal En and buffer 512 for driving E-mode transistor Q4, for example, to enable control switch 502. In one embodiment of the present invention, enable signal En can be provided by control circuitry 506. Thus, while control circuitry 506 is not powered and is not operational, E-mode transistor Q4 is disabled, thereby disabling control switch 502. However, when control circuitry 506 is powered and operational to drive control switch 502, control circuitry 506 can enable control switch 502 by enabling E-mode transistor Q4. Thus, protection circuitry 510 can prevent current conduction through control switch 502 while control circuitry 506 is not powered and is not operational.

Enabling protection circuitry 510 in voltage conversion circuit 500 requires a voltage on gate G4 of E-mode transistor Q4 that is greater than Vin by one threshold drop since E-mode transistor Q4 is an n-channel transistor. However, enabling protection circuitry 410 in voltage conversion circuit 400 requires a voltage on gate G3 of E-mode transistor Q3 that is less than Vin by one threshold drop since E-mode transistor Q3 is a p-channel transistor. Thus, protection circuitry 410 can be easier to implement since providing a voltage greater than Vin can require more complex circuitry (for example, a charge pump circuitry) than providing a voltage less than Vin.

Figure 6:
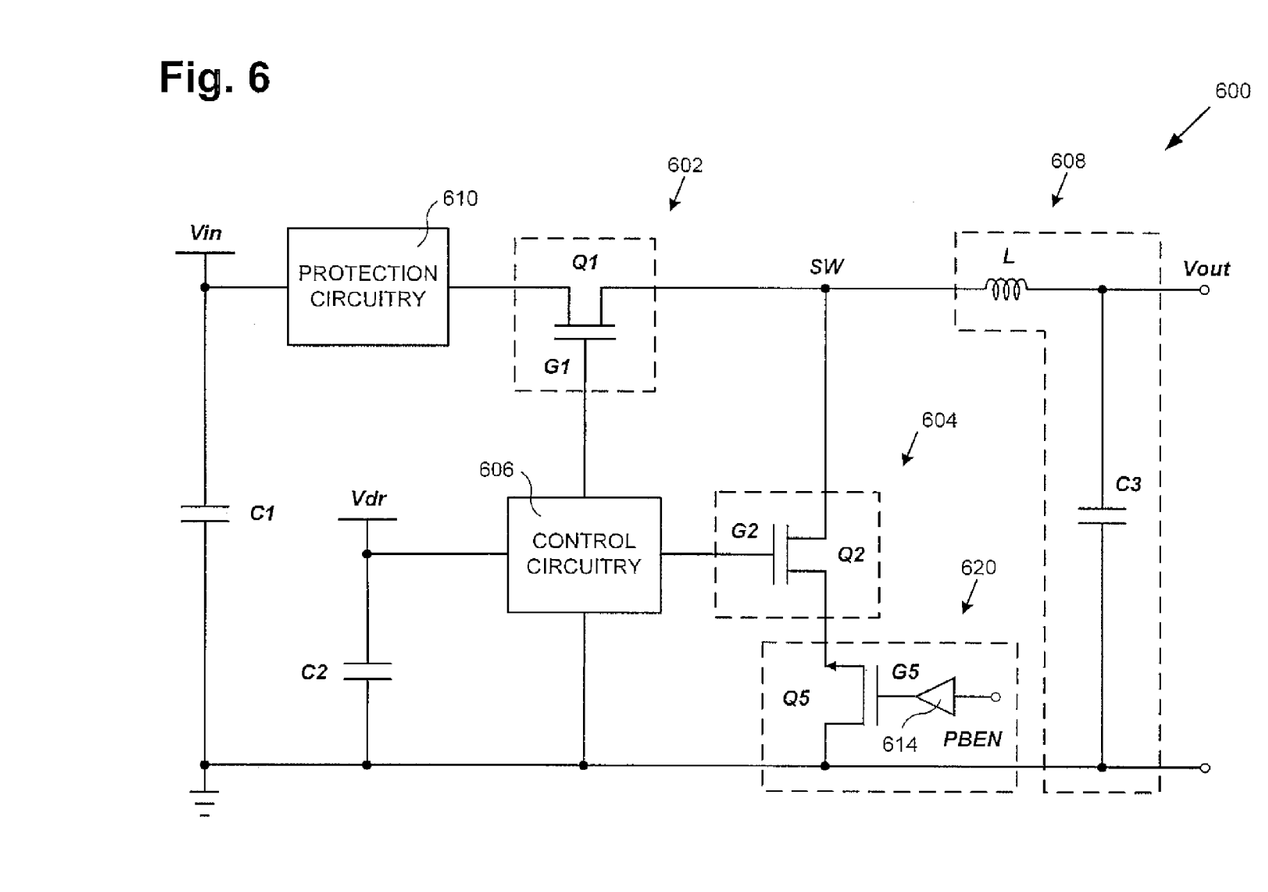
FIG. 6 shows a circuit diagram of an exemplary voltage conversion circuit in accordance with one embodiment of the present invention.

FIG. 6 shows a circuit diagram of an exemplary voltage conversion circuit in accordance with one embodiment of the present invention. Voltage conversion circuit 600 in FIG. 6 includes control switch 602, synchronous switch 604, control circuitry 606, output circuitry 608, protection circuitry 610, input voltage Vin, output voltage Vout, driver voltage Vdr, switched node SW, capacitor C2, and capacitor C1, which correspond to control switch 102, synchronous switch 104, control circuitry 106, output circuitry 108, protection circuitry 110, input voltage Vin, output voltage Vout, driver voltage Vdr, switched node SW, capacitor C2, and capacitor C1 respectively in FIG. 1. As such, voltage conversion circuit 600 can function similar to voltage conversion circuit 100 in FIG. 1.

Voltage conversion circuit 600 further includes protection switch 620, which is configured to provide additional protection to voltage conversion circuit 600. For example, protection switch 620 can protect voltage conversion circuit 600 from electrical damage due to a pre-biased condition, i.e. the presence of partial Vout during power up which may otherwise be undesirably discharged by synchronous switch 604.

As shown in FIG. 6, protection switch 620 is connected between synchronous switch 604 and ground. However, in other embodiments, protection switch 620 can be connected elsewhere in voltage conversion circuit 600. For example, protection switch 620 can be connected between switched node SW and synchronous switch 604, switched node SW and inductor L, inductor L and Vout, or elsewhere such that protection switch 620 can protect electrical components from a pre-bias condition.

In voltage conversion circuit 600, protection switch 620 comprises E-mode device Q5, which can comprise a silicon-based semiconductor device, for example, a silicon-based power MOSFET. In FIG. 6, protection switch 620 comprises an n-channel transistor, however in other embodiments, protection switch 620 can comprise a p-channel transistor. E-mode device Q5 includes gate G5 driven by buffer 614 and pre bias enable signal En. In an embodiment of the present invention, pre bias enable signal PBEN can be provided by control circuitry 606. Thus, while control circuitry 606 is not powered, E-mode transistor Q5 is disabled, thereby disabling conduction through synchronous switch 604 to preventing short circuit to ground. However, when control circuitry 606 is powered and operational to drive synchronous switch 604, control circuitry 606 can enable E-mode transistor Q5. Thus, protection switch 620 can prevent current conduction through synchronous switch 604 when control circuitry 606 is not powered and is not operational.

Thus, as discussed above, in the embodiments of FIGS. 1 through 6, the invention achieves a synchronous buck converter including a depletion-mode III-nitride control switch and a depletion-mode III-nitride synchronous switch. By including a depletion-mode III-nitride control switch and a depletion-mode III-nitride synchronous switch, the present invention can provide for low cost and efficient buck converters while utilizing III-nitride switches. Furthermore, by including protection circuitry the buck converter can disable current conduction through the control switch, for example, by selectively connecting and disconnecting the control switch from a voltage input provided to the buck converter. Thus, the buck converter can protect electrical components from damage while the control circuitry is not powered up.

From the above description of the invention it is manifest that various techniques can be used for implementing the concepts of the present invention without departing from its scope. Moreover, while the invention has been described with specific reference to certain embodiments, a person of ordinary skill in the art would appreciate that changes can be made in form and detail without departing from the spirit and the scope of the invention. Thus, the described embodiments are to be considered in all respects as illustrative and not restrictive. It should also be understood that the invention is not limited to the particular embodiments described herein but is capable of many rearrangements, modifications, and substitutions without departing from the scope of the invention.

The invention claimed is:

1. A buck converter comprising:
   a control circuitry coupled to a control switch;
   said control switch comprising a III-nitride transistor and interposed between an input and an output of said buck converter;
   a synchronous switch comprising another III-nitride transistor and interposed between said output and a ground;
   a protection circuitry configured to disable said control switch.

2. The buck converter of claim 1, wherein at least one of said control switch and said synchronous switch comprises a depletion-mode GaN HEMT.

3. The buck converter of claim 1, wherein said protection circuitry is configured to disable current conduction through said control switch while said control circuitry is not powered up.

4. The buck converter of claim 1, wherein said protection circuitry is coupled between said input of said buck converter and said control switch.

5. The buck converter of claim 4, wherein said protection circuitry disables current conduction through said control switch by disconnecting said input of said buck converter from said control switch.

6. The buck converter of claim 1, wherein said protection circuitry comprises an enhancement-mode transistor.

7. The buck converter of claim 1, wherein said protection circuitry comprises a silicon p-channel transistor.

8. The buck converter of claim 1, wherein said protection circuitry comprises a silicon n-channel transistor.

9. The buck converter of claim 1, further comprising another protection switch configured to disable current conduction through said synchronous switch while said control circuitry is not powered up.

10. A buck converter comprising:
    a GaN control switch interposed between an input and an output of said buck converter, and a GaN synchronous switch interposed between said output and said ground;
    a control circuitry coupled to said control switch;
    an enhancement-mode transistor coupled between said input and said control switch to disable said control switch while said control circuitry is not powered up.

11. The buck converter of claim 10, wherein said enhancement-mode transistor comprises a silicon p-channel transistor.

12. The buck converter of claim 10, wherein said enhancement-mode transistor comprises a silicon n-channel transistor.

13. The buck converter of claim 10, wherein said enhancement-mode transistor is coupled between said input of said buck converter and said control switch.

14. The buck converter of claim 10, wherein at least one of said control switch and said synchronous switch comprises a depletion-mode GaN transistor.

15. The buck converter of claim 10, further comprising another enhancement-mode transistor configured to disable said synchronous switch while said control circuitry is not powered up.

* * * * *